E. B. ROBY.
AUTOMATIC FOLDING MACHINE.
APPLICATION FILED OCT. 4, 1913.
1,160,957.
Patented Nov. 16, 1915.
11 SHEETS—SHEET 5.
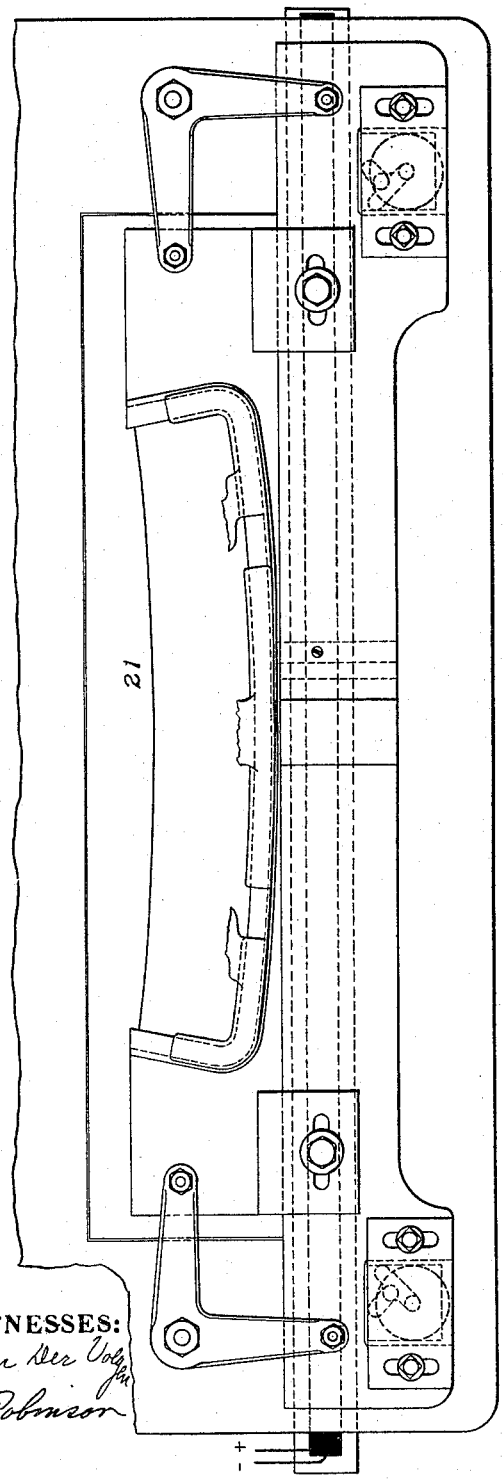
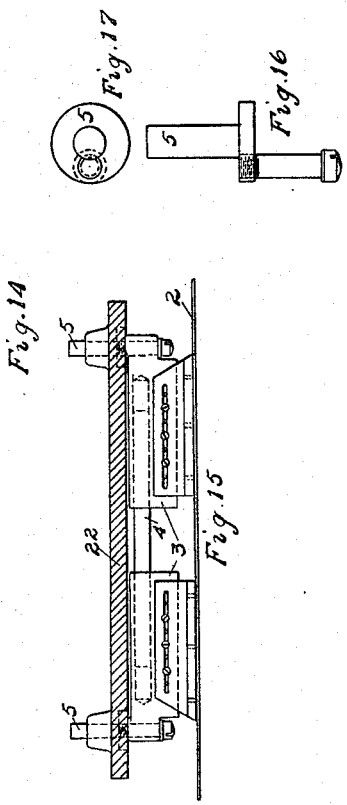
WITNESSES:
INVENTOR
Edward B. Roby
BY
Walter E. Ward
ATTY.

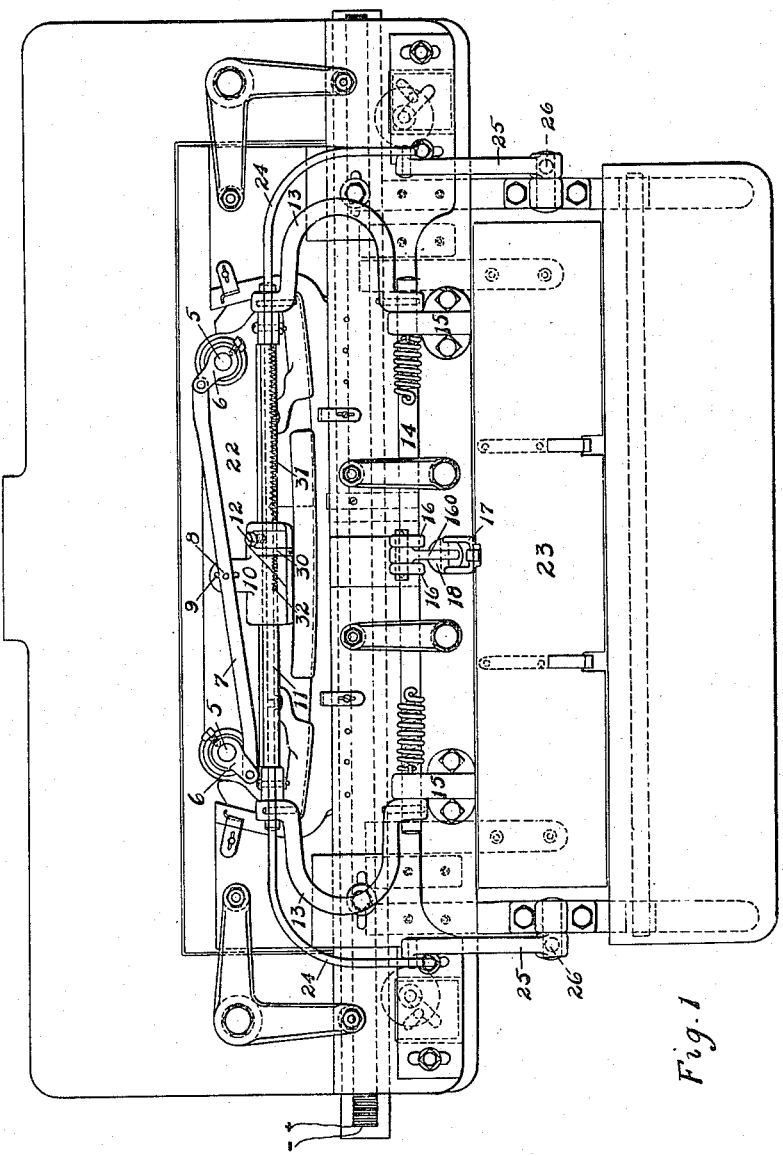

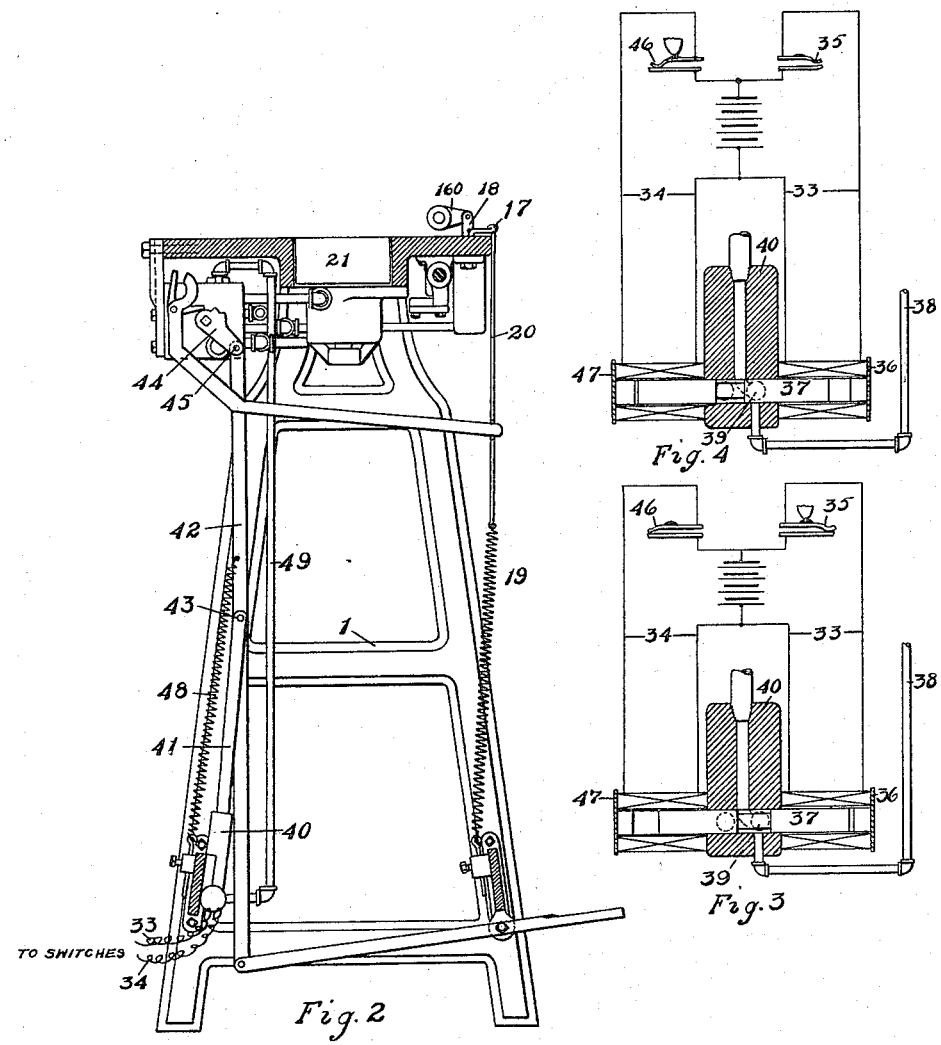

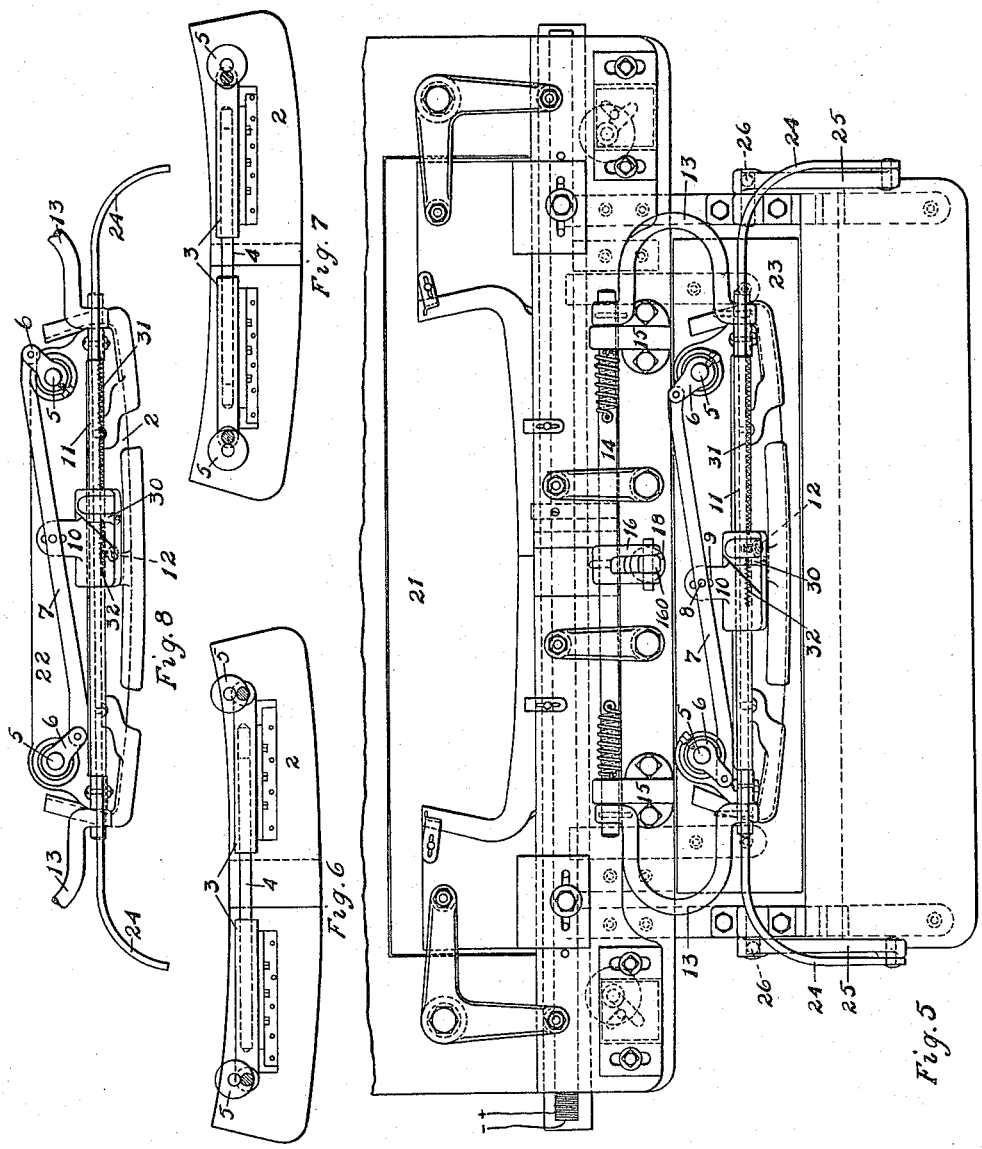

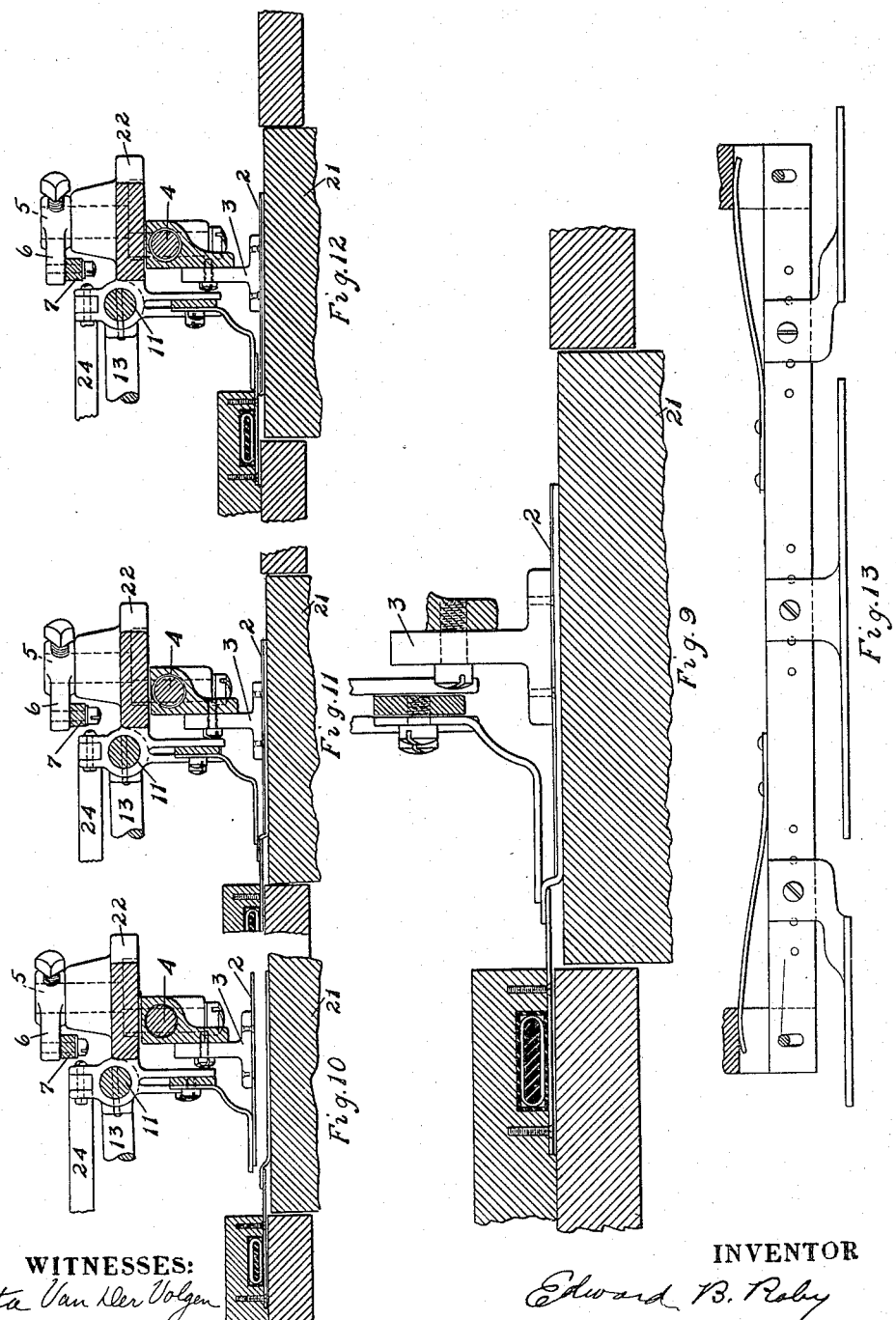

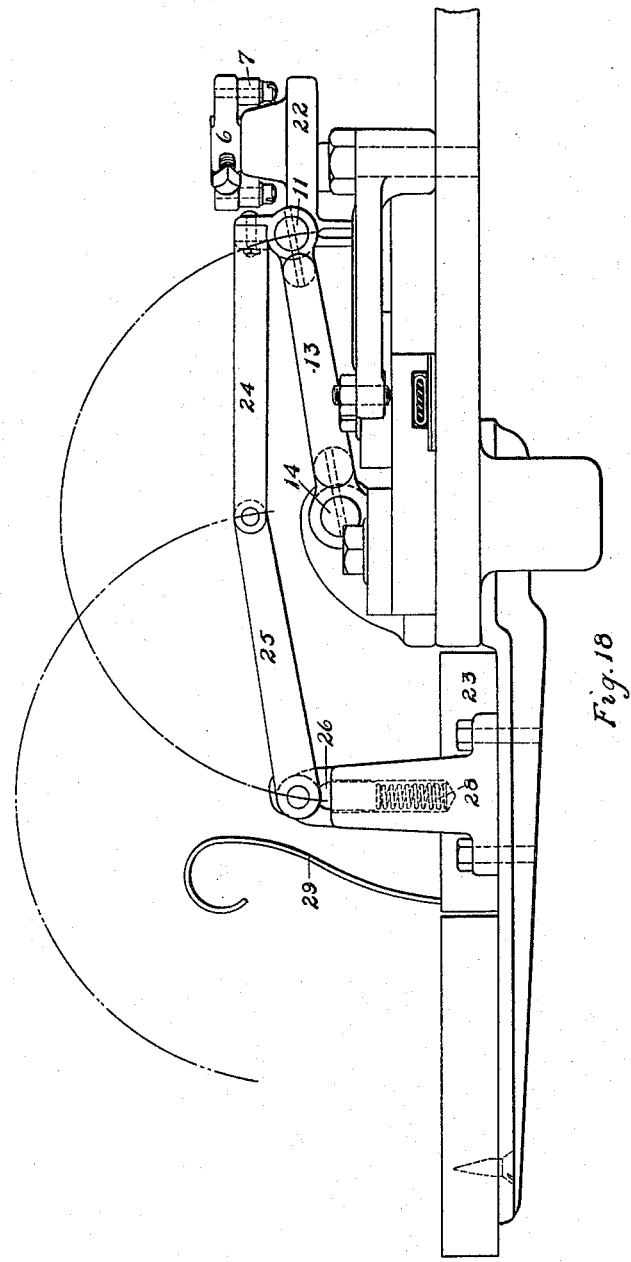

E. B. ROBY.
AUTOMATIC FOLDING MACHINE.
APPLICATION FILED OCT. 4, 1913.
1,160,957.
Patented Nov. 16, 1915.
11 SHEETS—SHEET 7.
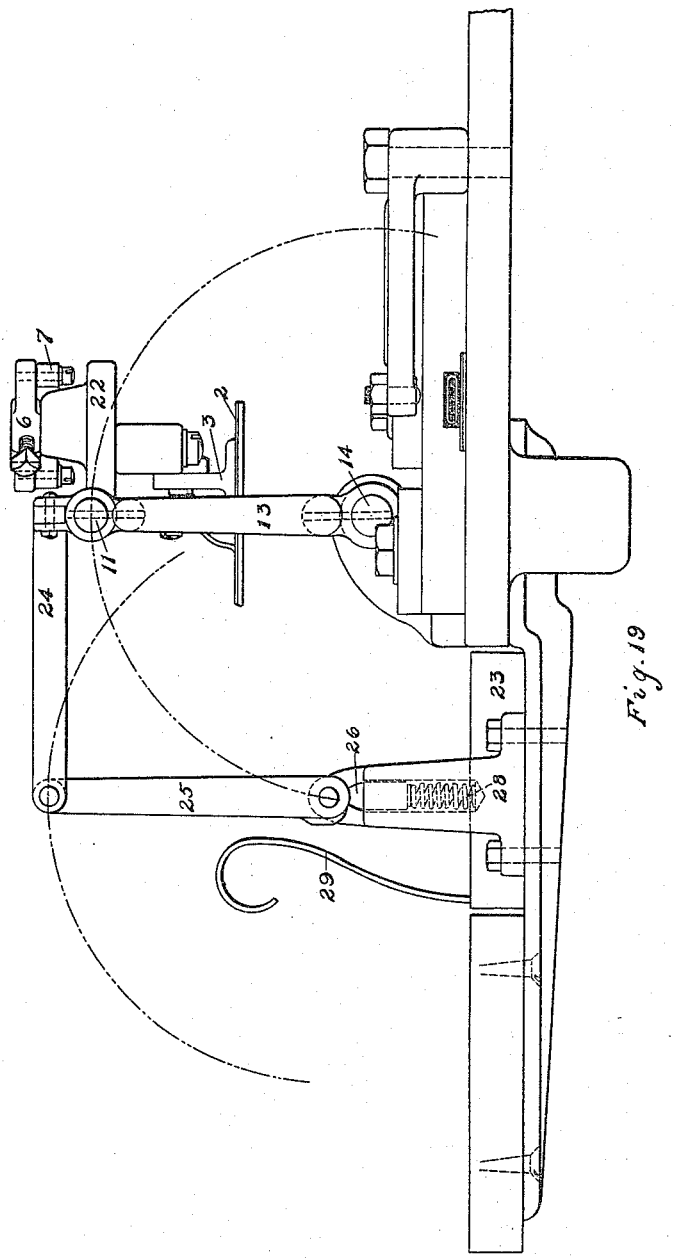
WITNESSES:
INVENTOR
BY
ATTY.

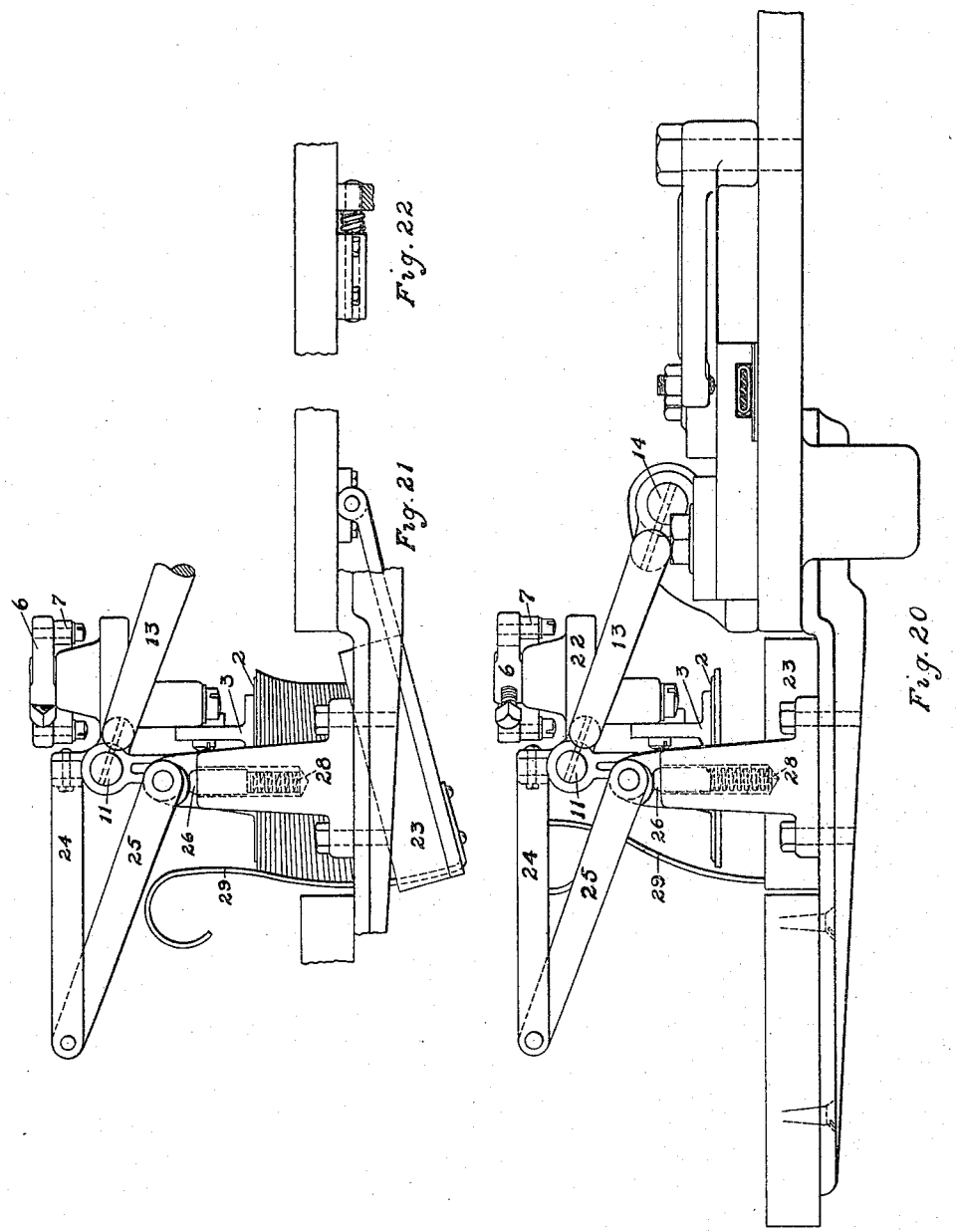

E. B. ROBY.
AUTOMATIC FOLDING MACHINE.
APPLICATION FILED OCT. 4, 1913.
1,160,957.
Patented Nov. 16, 1915.
11 SHEETS—SHEET 9.
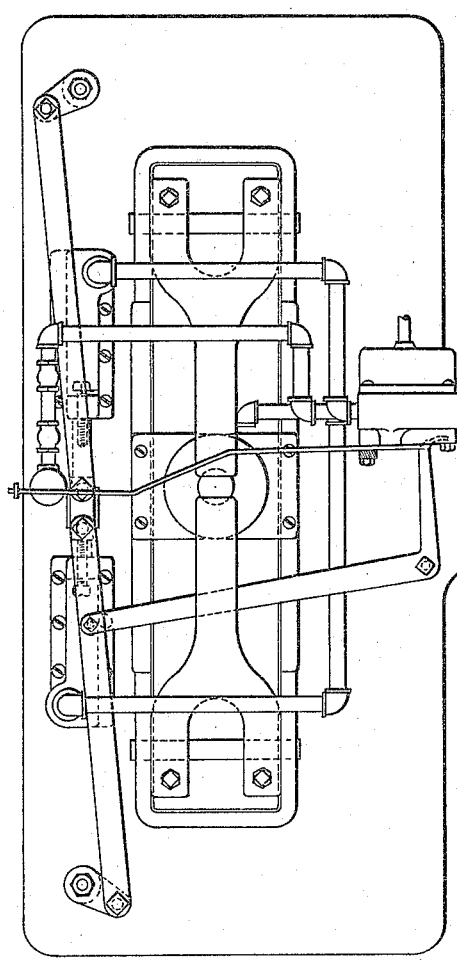
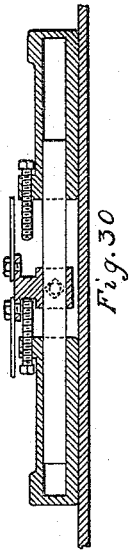
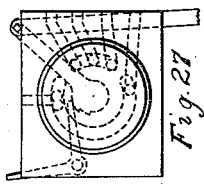
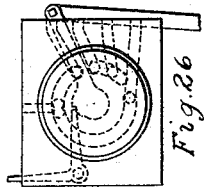
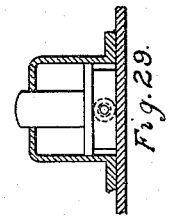
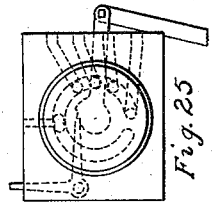
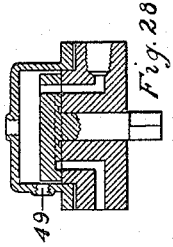
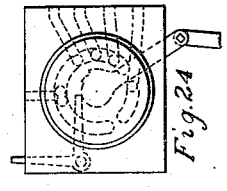
WITNESSES
INVENTOR
Edward B. Roby
BY
Walter E. Ward
ATTY.

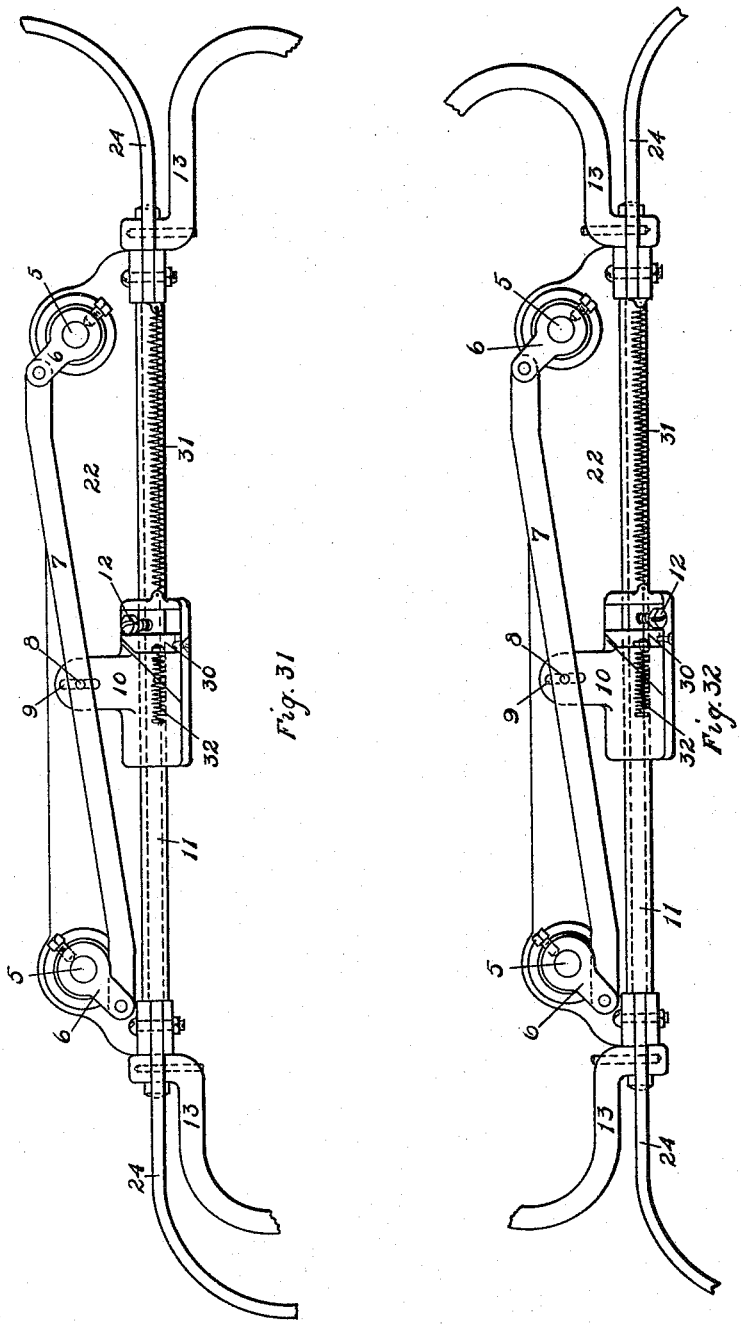

E. B. ROBY.
AUTOMATIC FOLDING MACHINE.
APPLICATION FILED OCT. 4, 1913.
1,160,957.
Patented Nov. 16, 1915.
11 SHEETS—SHEET 11.
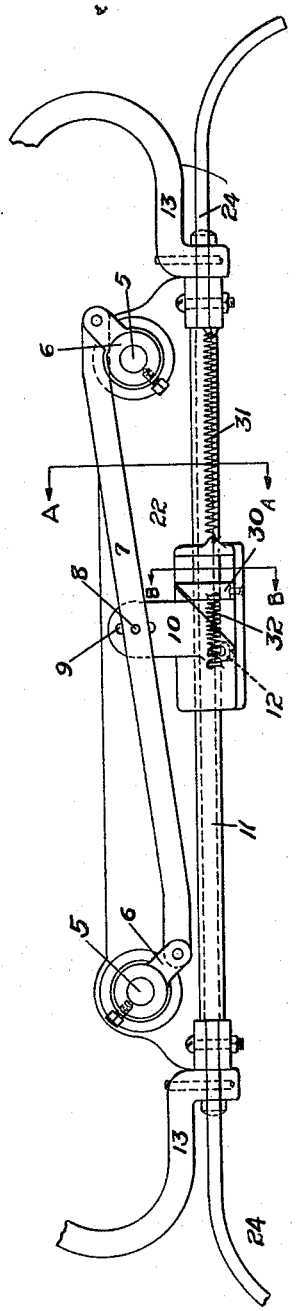
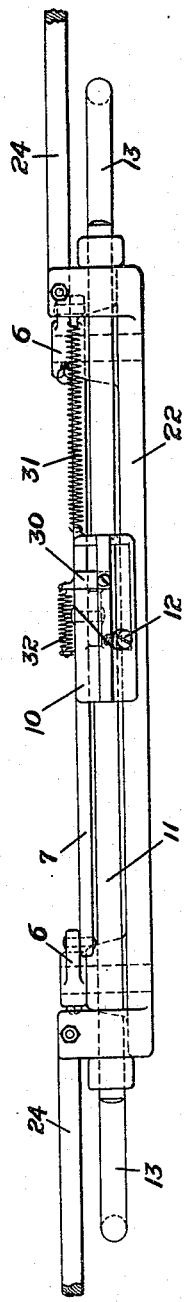
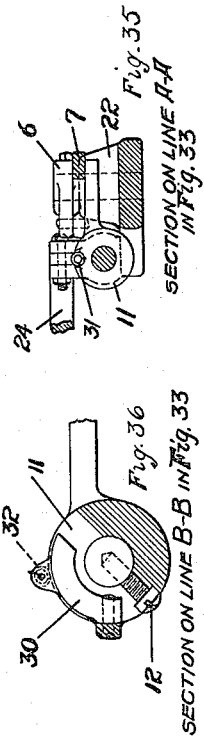
WITNESSES:
Minnie Montanye
Walt J. Ward
INVENTOR
Edward B. Roby
BY Walter E. Ward
ATTY.

UNITED STATES PATENT OFFICE.

EDWARD B. ROBY, OF TROY, NEW YORK, ASSIGNOR TO MARGARET L. HEALD, OF COLONIE, NEW YORK.

AUTOMATIC FOLDING-MACHINE.

1,160,957.  Specification of Letters Patent.  Patented Nov. 16, 1915.

Application filed October 4, 1913. Serial No. 793,355.

*To all whom it may concern:*

Be it known that I, EDWARD B. ROBY, a citizen of the United States, residing at Troy, in the county of Rensselaer and State of New York, have invented certain new and useful Improvements in Automatic Folding-Machines, of which the following is a specification.

My invention relates to folding machines and the objects of my invention are to construct pneumatic folding machines by which the collars will be rapidly folded and pressed over the die upon the bed-plate and then piled automatically on the receiving table.

Other objects of my invention and novel features of my folding machine will appear further in the drawings and specification.

I accomplish these objects by means of the mechanism illustrated in the accompanying drawings in which,—

Figure 1 is a top plan view of my folding machine with the die in position on the bed-plate and with the folder-plates over the blanks to be folded. Fig. 2 is a vertical cross section of my folding machine without the die or folder-plates. Figs. 3 and 4 are detailed diagrams of wiring and parts of mechanism of the machine. Fig. 5 is a top plan view with the die off the bed-plate and not collapsed and the folder-plates open. Figs. 6, 7 and 8 are details of the die-plates in different positions. Fig. 9 is a sectional view of parts of the bed-plate, folder-plate, die and die-head. Fig. 10 is a sectional view showing the collar blank in position on the bed-plate and the die ready to descend upon it with the folder-plates out ready to fold the edges of the blank over the edges of the die. Fig. 11 is the same as Fig. 10 except that the die is down in position on the blank and the folder-plates still out ready to fold the edges of the blank over the edges of the die. Fig. 12 is the same as Figs. 10 and 11 with the folder-plates moved inwardly in position of folding the edges of the blank over the edges of the die. Fig. 13 is a front elevation of the fold-holder attached to the die-head for holding the fold in the goods after the collar blank is pressed. Fig. 14 is a top plan view with parts broken away showing the folder-plates closed over the goods on the bed-plate and the fold-holder in position resting on the folder-plates. Fig. 15 is a front elevation of the die and die-head. Figs. 16 and 17 are details of the eccentrics for operating the die. Fig. 18 is a side elevation of the mechanism for piling the goods and shows the folder-plates closed over the goods on the bed-plate. Fig. 19 is a side elevation of the same showing the folder-plates withdrawn and the die carrying the goods. Fig. 20 is a side elevation of the same showing the die carrying the goods and in position to deposit the same on the pile. Fig. 21 shows the same with the die collapsed and the goods placed on the pile in position. Fig. 22 is a detail of the spring tension for the piling table. Fig. 23 is an inverted plan view showing the pneumatic operating mechanism. Figs. 24, 25, 26, 27 and 28 are detailed views of the compressed air valves operating the folding machine. Fig. 29 shows the cylinder for operating the pressure bed. Fig. 30 shows the cylinder for operating the folder-plates. Fig. 31 is a top plan view of the die-head in the position in which the die rests upon the bed-plate. Fig. 32 is a top plan view of the die-head showing its position just before the die collapses to let loose the collar blank. Fig. 33 is a top plan view showing the position of die-head after the die has collapsed allowing the collar blank to fall upon the table. Fig. 34 is the front elevation of the die-head as shown in Fig. 33. Fig. 35 is a section of the die-head on line A—A Fig. 33. Fig. 36 is a section of the die-head on line B—B Fig. 33, showing the cam-block.

Similar numerals refer to similar parts throughout the several views.

United States Patent No. 1,053,477 issued February 18, 1913, to Margaret L. Heald, executrix of Eugene H. Brown, for pneumatic folding-machine, shows a folding machine operated by pneumatic pressure for folding collars and cuffs. My present invention is an improvement upon the folding machine shown and described in said patent and consists of substantially the same mechanism and operation shown in said patent with the exception that the cylinder which operates the head of the folding machine is differently constructed, operated and located as will be hereinafter described, and in addition to the mechanism shown in said patent I show a mechanism for piling collar blanks instead of leaving it for the operator to do by hand, and a mechanism for operating the machine automatically by pneumatic pressure controlled by electric current instead of by the foot of the operator. There are other details and new features in the machine for making the same operate more rapidly and which will appear in the specification and drawings.

Referring to the drawings, 1 represents the frame of the machine. 2 is the die. The goods are pressed over the die and the die is not collapsed until the goods are pressed. The die is made in two sections as shown in Figs. 6 and 7. The die may be made of any suitable thin metal. The two sections of the die are held together by blocks 3, 3 which are so constructed as to allow the die to be adjusted in different lengths. The die itself is made in any style and size which may be desired by the manufacturer. The blocks 3, 3 are attached to the sections of the die in any suitable manner.

4 is an alinement rod extending into the blocks 3, 3 to keep the sections of the die in proper alinement in folding the goods. The blocks 3, 3 are called fold holders and hold the fold in the goods as hereinafter described.

5, 5 are eccentrics for operating the sections of the die. The eccentrics 5, 5 are attached to the blocks as shown in Figs. 11 and 15.

6, 6 are two levers fixedly attached to the eccentrics. These levers are connected together by a rod 7 and the rod 7 has the pin 8 which operates in the slot 9 in the cam-block 10 so that when the cam-block 10 moves from left to right it moves the rod 7 along with it and moves the connecting levers 6, 6 and operates the eccentrics 5, 5 one-quarter of a turn and this causes the sections of the die to open and collapse. The cam-block 10 is operated by the rod 11 by means of the cam roll 12 which is fixedly attached to the rod 11. The rod 11 is attached to the U-shaped arches 13, 13 by any suitable means at corresponding ends of the arches. The arches 13, 13 are also fixedly attached at their opposite ends to the bar 14.

The bar 14 rotates in bearings 15, 15 and is operated by the crank 16 which is fixedly attached to the bar 14 and is in turn operated by the link 160 which is operated by the piston 18. The piston 18 operates the link 160 in one direction only. The link 160 is returned to place by the spring 19, as shown in Fig. 2. The spring 19 is a continuation of the rod 20 which is attached to the piston 18 by the arm 17 to which the link 160 is hinged.

21 is the bed-plate of the machine. Figs. 9, 10, 11 and 12 show the bed-plate with one section of the die only, it being understood that the corresponding section of the die has like blocks and operating mechanism. The collar blanks may be placed upon the bed plate by hand or by any suitable means as by the automatic feeding device for which I have filed in the

United States Patent Office an application for patent, dated October 4th, 1913, Serial No. 793,354. After the goods are fed upon the bed-plate the die which is attached to the die-head 22 descends upon the goods and the folder-plates fold the edges of the collar blanks over the edges of the die and they are pressed over the die, without the die being collapsed, and then after the folder-plates are removed the die with the goods upon it, without being collapsed, takes the goods from the bed-plate to the piling table 23, Figs. 5 and 21. The die is then collapsed and the goods drop upon a pile as shown in Fig. 21. The fold holder 3 attached to the die head presses upon the goods in the pile and tends to fix and hold the fold in the goods. The parts are operated in the following manner.

The goods are folded over the die and pressed upon the bed-plate as described in Patent No. 1,053,477. The die-head carrying the die-plate is raised by the spring 19 and the rod 20 which are attached to the piston 18, as above described. When the piston 18 returns the rod 14 rotates in its bearings and in turn swings the U-shaped arches 13, 13 which operate the rod 11 which in turn carries the die-head.

24 and 25 are guide-links to maintain the die in a horizontal position. The die-head carrying the die proceeds until it reaches the position shown in Fig. 21. The die is then collapsed and the goods deposited in a pile as shown in said figure. 26 is a plunger which rests upon the spring 28 as shown in said figure.

29 is a guide of any suitable construction or form for holding the collars in a uniform pile when deposited upon the receiving table from the die. The die is collapsed by the rotation of the bar 11 to which is attached the cam roll 12 as shown in Figs. 5 and 8. When the bar 11 rotates in its bearings, by the arches 13, 13 as heretofore described, the cam roll 12 is operated and comes in contact with the trigger 30 which holds the cam 10 in position until the screw 12 has traveled below the trigger 30. The cam roll 12 then releases the cam 10 and causes the spring 31 to draw the cam 10 from left to right and also moves with it the rod 7 attached to the cam and the levers 6, 6 attached to the rod 7. The levers 6, 6 being attached to the eccentrics cause them to turn and collapse the die as above described. When it reaches this position the die collapses and the goods drop off in the pile. The die-head then carries the die back in position.

32 is a spring mounted on the cam 10 which operates the trigger 30 after the screw 12 has traveled above the trigger 30 at which time the spring 32 springs the trigger back to position.

33 is an electric wire leading from the electrical apparatus of the feeding machine to the valve on the folding machine.

34 is a like wire also leading from the feeding machine to the valve of the folding machine. When the current is applied to the wire 33 from the switch 35 which is a part of the feeding machine the magnet 36 is energized which by the force of its magnetism operates the piston valve 37 so as to open the port and allow the compressed air to flow from the pipe 38 into the port 39 and so into the cylinder 40. The compressed air forces the piston located in said cylinder upward. This piston in turn forces upward the connecting rod 41 attached to the piston in the cylinder which is in turn attached to the pedal rod 42 by the pivot 43. The pedal rod 42 is pivotally attached to the valve lever 44 by the pivot 45. The valve lever 44 performs the same functions and is the same as valve lever 4 in U. S. Patent No. 1,053,477.

The die-head carrying the die is removed from the bed-plate by the reverse operation. When the wire 34 comes in contact with the switch 46 and closes said contact, as shown in Fig. 4, the wire 33 is no longer in contact with the switch 35. The switch 46 being closed the magnet 47 is energized and the valve 37 is moved the other way and closes the air chamber and opens the exhaust port and lets the air out of the cylinder 40, causing the connecting rod 41 to descend, allowing the spring 48 to draw the pedal rod 42 down, causing the valve lever 44 to open the exhaust port and at the same time close the pressure port. This allows the folder-plates to withdraw, as will be hereafter described, and allows the die-head carrying the folded collar blank to go back in position and deposit the blank in the pile as already described.

49, as shown in Fig. 2, is an air pipe extending from the compressed air chamber, as shown in Fig. 28, connecting the compressed air chamber with the magnetic operating mechanism just described. Otherwise the compressed air chamber and the valves and ports and the operation of the same are as described in U. S. Patent No. 1,053,477.

Constructed in this way my folding machine is adapted to be used with the automatic feeding machine for which I have applied for a patent as above stated. The feeding machine feeds automatically to the folding machine. The folding machine then takes the goods and folds and presses them over the die and the die without being collapsed takes the goods from the bed-plate of the machine and piles them on the receiving table as hereinbefore described. The feeding machine is so timed that the blanks will be fed upon the bed-plate of the folding machine when the die-head carrying the die-plate is removed from the bed-plate, as above described, and is depositing the blank upon the receiving table and the bed-plate is free from the die-plate. The mechanism for timing this operation is described in my application for the feeding machine above referred to. The fold-holder operating with the die, keeps the goods and the fold in better condition, and delivers the goods more accurately than can otherwise be done.

The electrically operated foot pedal works much more easily and rapidly than by hand or foot power and the work of placing the blanks in the machine is far more rapid and accurate than can possibly be done by hand and the two machines being used together will fold collar and cuff blanks more economically and rapidly than can otherwise be accomplished.

What I claim as my invention and desire to secure by Letters Patent is,

1. In a machine of the class described a frame, a vertically movable bed-plate mounted upon said frame, a die-head, a die, folder-plates, a receiving table, a chamber adapted to receive compressed air, separate cylinders, one of which is adapted to operate said bed-plate and one of which is adapted to operate the folder-plates, pipes extending from said compressed air chamber to said cylinders whereby said folder-plates and bed-plate may be operated successively by means of compressed air from said chamber, and means for carrying the goods upon said die from said bed-plate to said receiving table and collapsing the die whereby said goods will be deposited upon said receiving table.

2. In a folding machine a frame, a bed-plate mounted upon said frame, a die-head, a die, a fold-holder attached to said die-head, a compressed air chamber adapted to receive compressed air, a cylinder, connections between said cylinder and said compressed air chamber, means for admitting compressed air from said chamber to said cylinder, a piston in said cylinder adapted to be operated by said compressed air, a valve adapted to allow compressed air to enter said cylinder, means for controlling said valve by electric current, a rotary plate located in said compressed air chamber, a stem attached to said rotary plate, a valve lever attached to said stem, a foot pedal pivoted to said frame and means for operating said foot pedal by said piston whereby said folding machine may be operated automatically by an electric current.

3. In a machine of the class described a frame, a bed-plate, a die-head, a die, folder-plate adapted to fold the goods over said die upon said bed-plate, a fold-holder attached to said die-head, a pressure chamber, separate cylinders adapted to operate said die and folder-plates respectively, pipes adapted to conduct compressed air from said chamber to said cylinders, a rotary plate in said chamber covering the openings to said pipes, a rotary plate adapted to allow compressed air to said pipes, passageways under said rotary plate, one of said passageways adapted to allow compressed air to pass from the port to the pipes leading to said cylinders and the other passageway adapted to allow the exhaust from said cylinders to escape and means for automatically turning said rotary plate to successively open and close said openings by electric current.

4. In a machine of the class described adapted to be operated by pneumatic pressure, a frame, a vertically movable bed-plate a die-head, a die attached to said die-head, a fold-holder attached to said die-head, folder-plates adapted to close over said die upon said bed-plate, means for pressing goods upon said bed-plate over said die, a compressed air chamber, means for operating said folder-plates by compressed air from said chamber, means for moving said die-head horizontally with the goods upon it to a point above a receiving table, a receiving table adapted to receive the goods from said die, means for collapsing said die automatically whereby the goods upon said die will fall upon said receiving table and said fold-holder will hold the fold in said goods while being deposited upon said receiving table and means for returning said die-head and said die attached thereto to said bed-plate and expand said die automatically after the goods have been deposited upon said receiving table.

5. In a folding machine a frame, a bed-plate, a die-head, a die, folder-plates, a receiving table, a fold-holder, means for moving said folder-plates over said die upon said bed-plate, means for pressing the goods folded over said die between the folder-plates and the bed-plate, means for moving said die-head horizontally with the goods upon it to a point above said receiving table, means for collapsing said die at a point above said receiving table whereby the goods will fall from said die upon said receiving table, and means for pressing the fold-holder upon said goods when deposited upon said receiving table, substantially as described for the purposes set forth.

In testimony whereof I affix my signature in presence of two witnesses.

EDWARD B. ROBY.

Witnesses:
 WALTER E. WARD,
 RETA VAN DER VOLGEN.

Copies of this patent may be obtained for five cents each, by addressing the "Commissioner of Patents, Washington, D. C."